May 12, 1970   G. B. BOUCHERIE   3,511,540
BRUSH MANUFACTURING MACHINE
Filed June 23, 1967   5 Sheets-Sheet 1
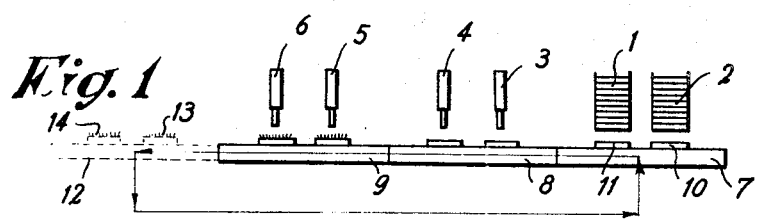
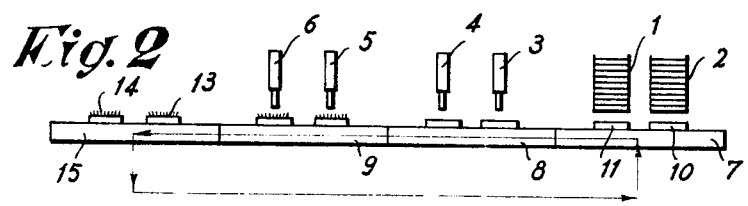
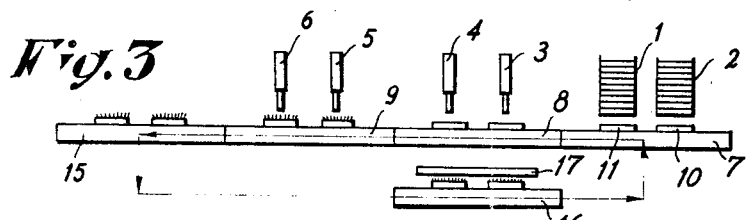
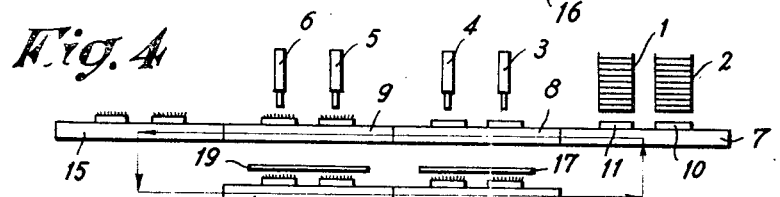
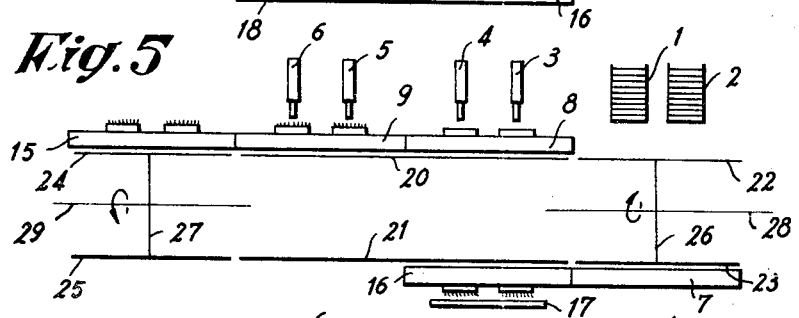
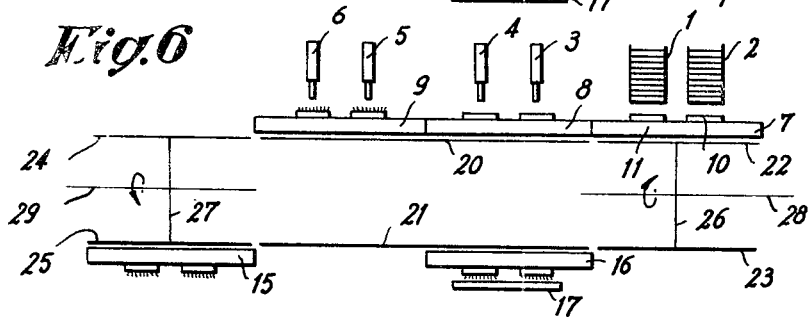
INVENTOR.
GERARD BENONI BOUCHERIE
BY
Richards & Geier
ATTORNEYS May 12, 1970 G. B. BOUCHERIE 3,511,540
BRUSH MANUFACTURING MACHINE
Filed June 23, 1967 5 Sheets-Sheet 2

BY
GERARD BENONI BOUCHERIE
INVENTOR.

ATTORNEYS

May 12, 1970        G. B. BOUCHERIE        3,511,540

BRUSH MANUFACTURING MACHINE

Filed June 23, 1967        5 Sheets-Sheet 4

BY
GERARD BENONI BOUCHERIE
INVENTOR.

ATTORNEYS

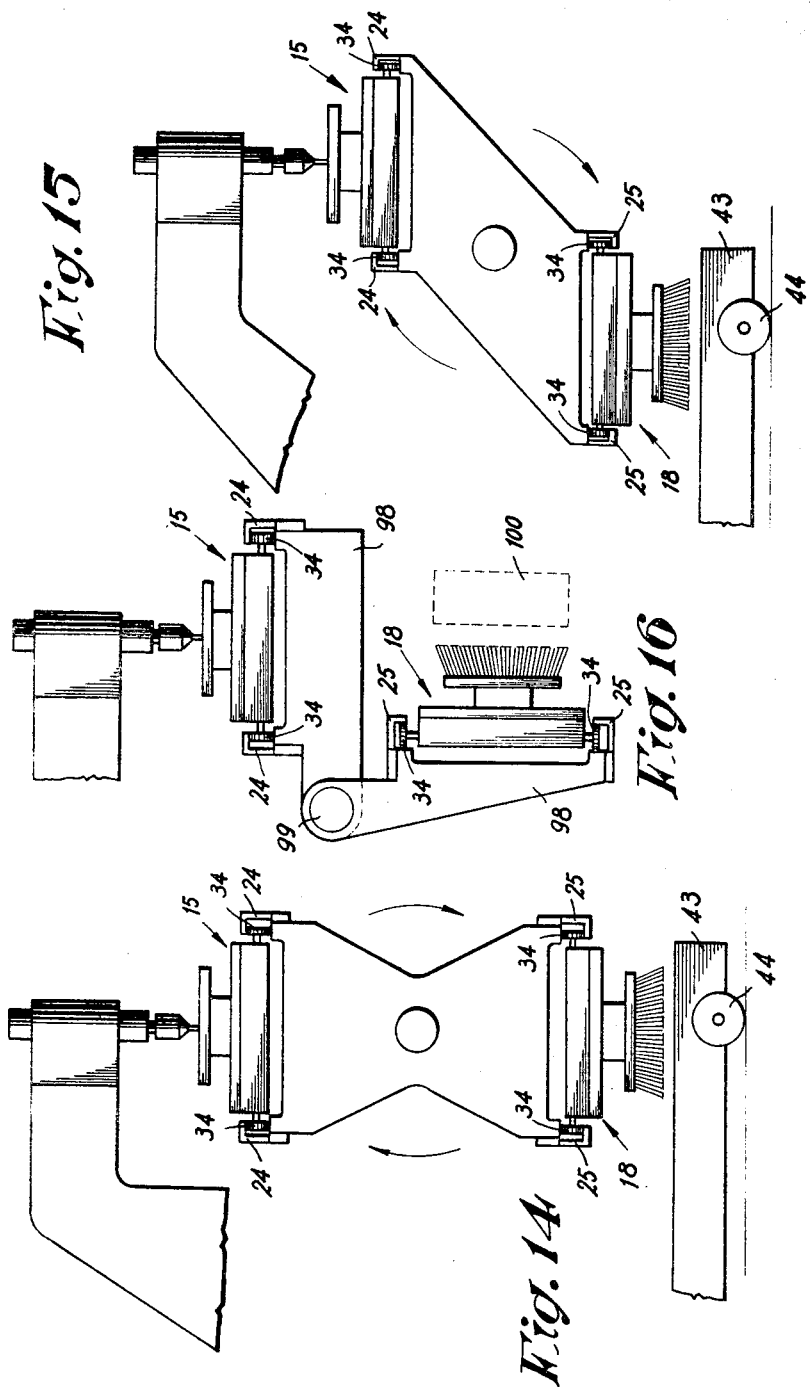

United States Patent Office 3,511,540
Patented May 12, 1970

3,511,540
BRUSH MANUFACTURING MACHINE
Gerard Benoni Boucherie, Potaardestraat 1,
Rumbeke, Belgium
Filed June 23, 1967, Ser. No. 648,349
Int. Cl. B25b 11/00
U.S. Cl. 300—11    8 Claims

ABSTRACT OF THE DISCLOSURE

A brush manufacturing machine comprising the combination of at least three independent trolleys onto which one or several workpiece-holders are mounted and means for moving said trolleys in a closed circuit along processing stations.

---

The present invention concerns an improved brush manufacturing machine of the type in which the work pieces, which in the present instance are brush bodies, are placed onto separate workpiece-holders in order to subsequently undergo the various processes in their various relative positions.

It is a well known fact that in so-called chain processing machines a comparatively very large number of workpiece-holders are mounted on an endless chain, their number being of the order of 10 to 12 which travel successively under the various processing devices, such as more particularly a filling magazine, a drilling device, a filling device and maybe, cleaning and cutting devices, whereby for this purpose said chain is made endless and, for obtaining a continuous operating cycle, a workpiece-holder is provided on each link of the chain, while of this large number of workpiece-holders only a maximum of five per set of tools are operating together at one and the same time.

A first disadvantage of such chain machines is that, due to the large number of workpiece-holders, they are very costly, because said workpiece-holders are fairly complicated contrivances of comparatively high precision.

On the other hand, the operating reliability of such machines is comparatively poor because, on account of the complexities of said workpiece-holders as well as of their large number, the slightest hitch occurring at one of them requires the whole machine to be shut down.

Another disadvantage of aforesaid chain machines consists in the fact that in case a finished brush must undergo some kind of special process which cannot be applied on the machine itself, that or those particular brushes must always be removed altogether from the machine in order to be subsequently fastened onto another machine, which necessarily means a lot of wasted time and hence a considerable increase of the manufacturing cost, apart from the additional difficulties resulting from the exact positioning of the brush onto the new holder with respect to the tools, which results in a high percentage of waste by rejections.

Still another disadvantage of aforesaid chain machines is that when switching over from a given make of brush to another type, the whole chain must be replaced or each one of the many links must be readjusted, whereby, on the one hand, the machine must remain idle for quite a long time and, on the other hand, a lot of operating time is lost and the production rate is reduced accordingly.

Still another handicap affecting aforesaid chain machines is that each link, respectively each workpiece-holder thereof must be provided with a so-called compensation adjustment, which again makes the machine more costly.

The object of the present invention is to provide an improved brush manufacturing machine which systematically excludes aforesaid and other drawbacks of the chain machine in question.

This object is achieved in the machine according to the present invention by limiting to a minimum the number of workpiece-holders, whereby the latter are mounted onto separate independent carriers which can be fastened to and removed from the machine together with said workpiece-holder and the brush body or bodies to be fastened thereon, so that when a brush requires some special operation to be carried out on it, it can easily be removed from the machine and placed onto another machine without any need for undoing, respectively refastening, either the brush body or the brush itself.

Due to the small number of workpiece-holders, the switching over from one make of brushes to another one is quite easily performed, which has a very beneficial effect on the cost price of brush manufacturing.

Finally, the improved brush manufacturing machine conforming to the present invention is provided with one single compensation adjustment which controls successively the various carriers onto which the workpiece-holders are mounted.

The improved brush manufacturing machine conforming to the present invention and which is fitted with aforesaid and other advantages, therefore substantially consists in the combination of at least three independent trolleys or slides onto which are mounted one or several workpiece-holders and means for moving said trolleys or slides in a closed circuit along aforesaid processing stations.

In order to show more clearly the characteristic features of the present invention, a few preferred modes of embodiment are described hereafter, without however implying any limitation, with reference to the appended drawings of which:

FIG. 1 is a diagrammatic representation of an improved brush manufacturing machine according to the present invention, whereby the number of carriers onto which the workpiece-holders are fastened is limited to three;

FIGS. 2, 3 and 4 are respectively diagrammatic representations in which four, five or six carriers are provided;

FIG. 5 shows in a diagrammatic way a mode of embodiment of the arrangement according to FIG. 3;

FIGS. 6 and 7 are views identical to that of FIG. 5. but show two other characteristic positions;

FIG. 14 is a diagrammatic cross-section of the installation according to FIG. 11;

FIGS. 15 and 16 are views similar to that of FIG. 14 but referring to two variants.

FIG. 1 illustrates diagrammatically the structure of a brush manufacturing machine making use of three under-carriages, slides or the like onto which the workpiece-holders are fastened.

Figure 7:
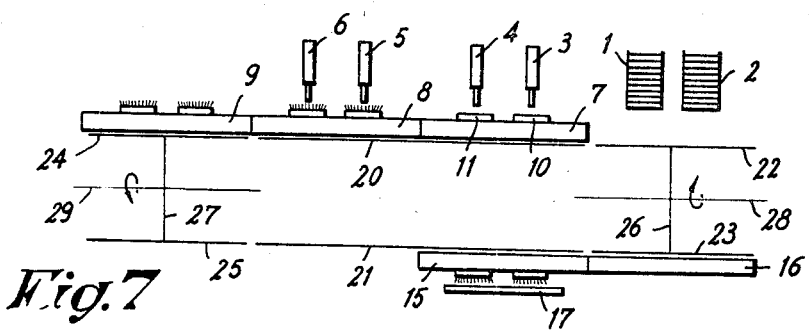

In this particular instance, the actual machine is illustrated diagrammatically by two magazines with brush bodies 1–2 and drilling tools 3–4 respectively, as well as two filling tools 5–6 respectively.

The under-carriages or trolleys, 7–8 and 9 respectively, are in this case provided with two workpiece-holders in order to make it possible to manufacture simultaneously two brushes per trolley.

In this case, two brush bodies 10–11 respectively, issuing from the magazines 1–2, are mounted on a first trolley, after which said trolley is brought under the drilling tools 3–4 in order, after the various holes have been drilled, to place said trolley under the filling devices 5 and 6 and finally to remove the finished brushes from the place of this trolley indicated diagrammatically at 12. Subsequently, the empty trolley is brought in an appropriate way under the magazines 1–2, after which the whole cycle is repeated.

This case, and more especially the case in which use is made of three trolleys, is only being applied when the drilling and filling of the brush bodies, such as for special brushes, takes a comparatively long time, so that there should be sufficient time for removing the finished brushes 13 and 14 from the corresponding trolley, for placing the latter under the magazines 1–2 and for mounting two brush bodies 10–11 on the trolley in question, while at the same time a pair of brush bodies are being drilled and two others are being filled with fibres.

In case the time required for drilling and filling two brush bodies is considerably shorter than the time which would be needed for removing the brushes, displacing the trolley under the magazines 1–2 and the subsequent placing of two brush bodies on said trolley, there will be an advantage in using four trolleys 7–8–9 and 15 respectively, as illustrated in FIG. 2.

In fact, in this case, it is possible while the finished brushes 13–14 are being removed from the trolley 15, to place brush bodies 10–11 onto trolley 7, while the brush bodies situated on the trolleys 8 and 9 can be processed when trolley 7 is moved under the drilling devices 3 and 4, and there is sufficient time for placing trolley 15 under the magazines 1–2 and for fastening brush bodies 10 and 11 onto this trolley.

If, still in one and the same unit of time, the finished brushes 13–14 must be cut in the brush manufacturing machine, it will be preferable to provide five trolleys 7–8–9–15 and 16 respectively, so that while two pairs of brush bodies are being drilled, respectively filled on the trolleys 8 and 9, trolley 16 is being brought under the cutting device 17. It is quite obvious that in such instance the time during which trolley 16 is situated under the cutting device 17, respectively the time during which the brushes are being cut, is for instance equal to the time which is needed for drilling, respectively filling of the brush bodies.

Finally, FIG. 4 illustrates an embodiment with six trolleys, 7–8–9–15–16 and 18 respectively, whereby in this case the cutting device 17 is brought on top of trolley 16, while a so-called combing device 19 is provided above trolley 18.

In this particular instance, a complete operating machine is obtained in which the trolley involved remains in the machine from the filling stage up to and including the completely finished brush.

The displacement of the trolleys from one end of the machine to the other end can take place in any convenient manner, for instance by moving said trolleys either in a horizontal entirely closed circuit, or in a vertical closed circuit, either by means of reversing drums, hinged levers or any other appropriate way.

FIGS. 5 to 7 illustrate an assembly comprising five trolleys, which corresponds to the kind illustrated in FIG. 3.

In these figures a guide 20 is provided under the central trolleys, in this case 8 and 9, while under said guide 20 a second guide 21 is provided which can take over aforesaid trolleys 7–8–9–15 and 16 from transmission guides.

Next to each one of the guides 20 and 21, other guides 22–23 and 24–25 respectively are provided, whereby the guides 22–23 and 24–25 are connected two by two by a frame 26–27 respectively, which can revolve on an axis 28–29 respectively.

In this way, so to say reversing drums are obtained by means of which trolley 15 for instance can be brought by a 180° rotation of the drum 24–25 26–29 into the position as illustrated in FIG. 6, subsequently to which, after removal of the brushes from said trolley 15, the latter can be brought above the cutting device 17, while trolley 16 is being pushed automatically onto the guide 23 of drum 22–23–27–28. Consequently, the trolleys 7–8 and 9 will be displaced in such way that they come respectively under the drilling device, the filling device, and on the guide 24 of the drum 24–25–27–29.

By rotating drum 22–23–26–28, the result is obtained that trolley 16 comes under magazines 1–2, after which the cycle can be repeated.

Figure 8:
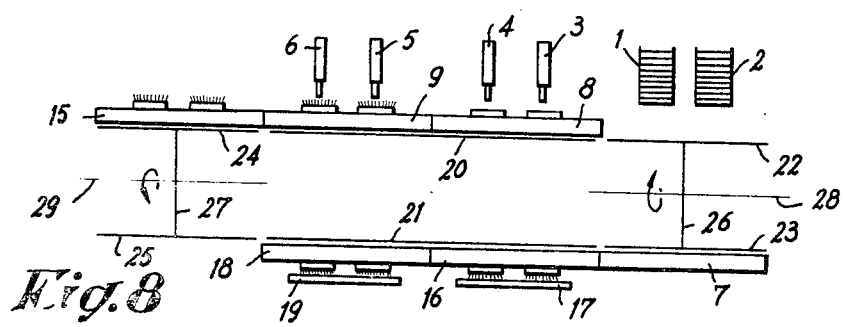
FIGS. 8, 9 and 10 show views corresponding respectively to those of FIGS. 5 to 7, but for a mode of embodiment wherein use is made of six supports.
Figure 9:
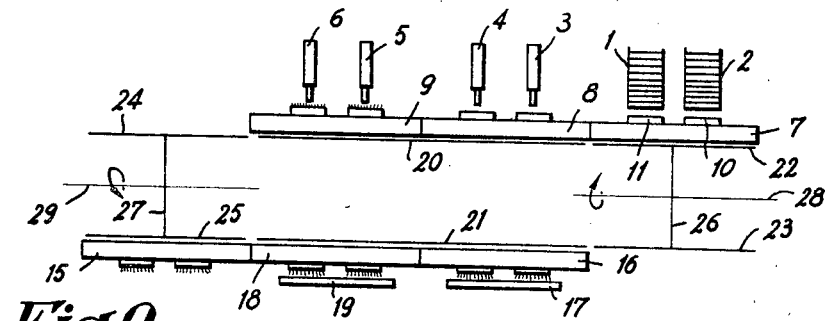
Figure 10:
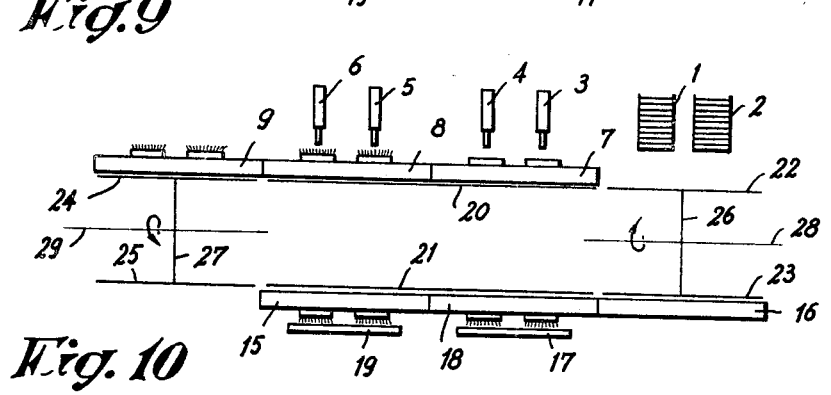

FIGS. 8–9 and 10 illustrate such diagrammatic type with six trolleys, more particularly according to the arrange of FIG. 4, whereby also reversing drums, 22–23–26–28, and 24–25–27–29 respectively are being used for moving about the various trolleys, while the straight guides 20 and 21 are also provided between the guides of aforesaid drums.

In this case, drum 24–25–27 and 29 and/or possibly simultaneously drum 22–23–26 and 28 can be rotated by 180° in order to reach the position illustrated in FIG. 9, after which the trolleys 7–8 and 9 are moved to the left while trolleys 16–18 and 15 are pushed to the right.

After removal of the finished brush, drum 22–23–26 and 28 and/or possibly simultaneously also drum 24–25–27–29 is being rotated by 180°, so that the trolley 16 is brought under magazines 1–2 for receiving undrilled brush bodies and trolley 9 comes to stand next to trolleys 15–18.

In this case, the time for cutting and combing the finished brushes is a maximum, so that the displacements of aforesaid drums can be carried out while, on the one hand, brush bodies are being drilled and filled and, on the other hand, the finished brushes are being cut and combed.

Figure 11:
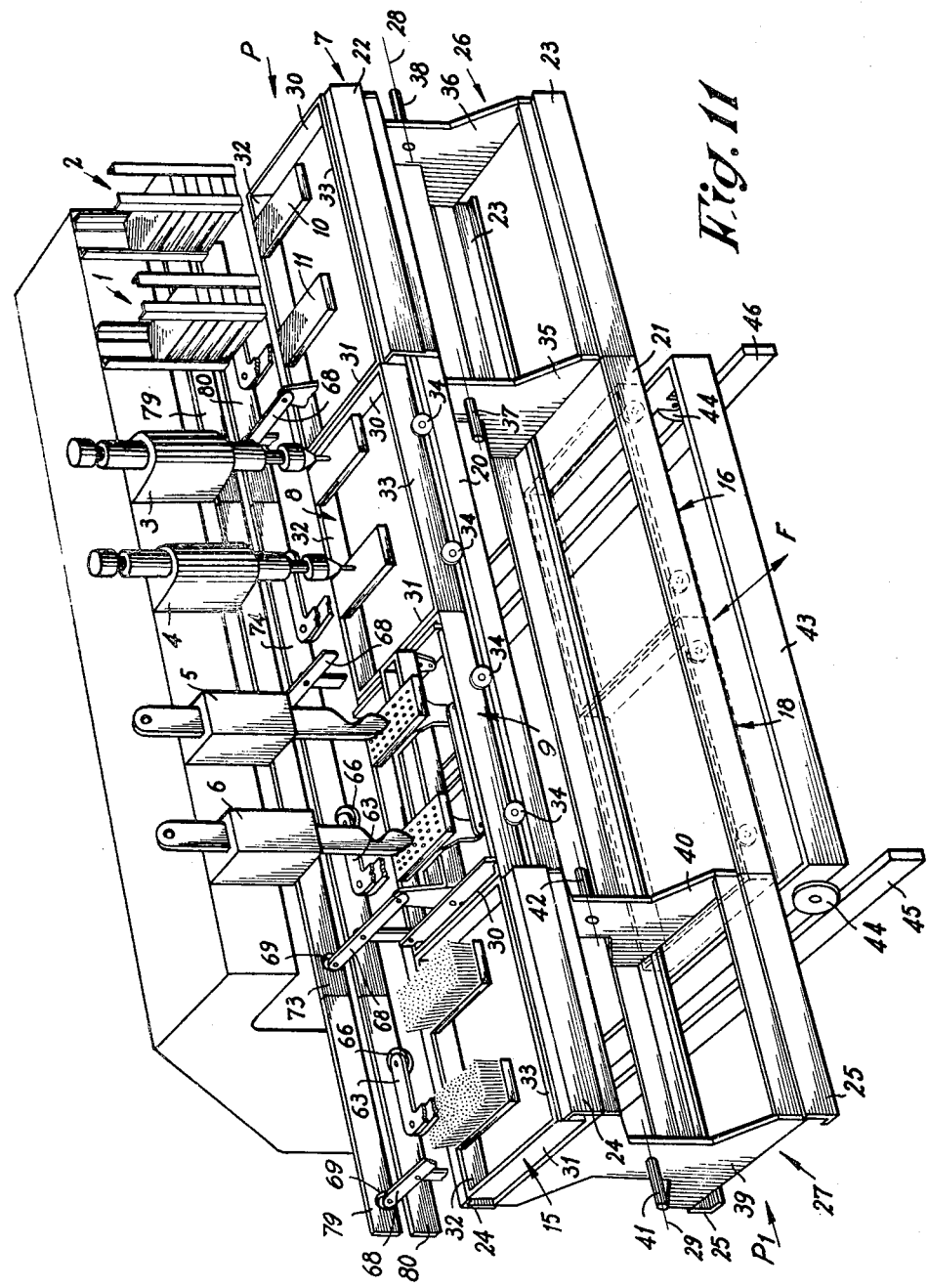
FIG. 11 illustrates diagrammatically and in perspective an installation according to the present invention.

FIG. 11 illustrates a perspective view of an improved brush manufacturing machine according to the present invention, in which for moving the various trolleys use is made of aforesaid reversing drums.

In this case it can also be noticed that magazines 1–2, the drilling devices 3–4 and the filling devices 5–6 are each controlled in the traditional way.

The trolleys 7–8–9 and 15 are all identical and substantially consist of four walls, 30–31–32–33 respectively, onto which the actual workpiece-holder is fastened in the way which will be described hereafter.

Each trolley is provided with two pairs of wheels 34 by means of which they can, on the one hand, be moved on a pair of guides 20 and, on the other hand, on a pair of guides 21.

At one end of the guides 20–21, a reversing drum is provided which is substantially made of a pair of guides 22 and a pair of guides 23 connected together by the frame 26 which, in this case, consists of plates 35–36 respectively, of which each one is provided with a shaft stump, 37–38 respectively, with which the drum can be supported on a fixed part of the machine in order to make it possible to rotate said drum on its axis 28. It is quite obvious that aforesaid shaft stumps 37–38 can also be replaced by one single through-running shaft.

At the other end of the guides 20–21, the reversing drum is formed in an identical way by a pair of guides 24 and a pair of guides 25 which are connected together by a frame 27 consisting of plates 39–40, whereby each one of aforesaid plates carries a shaft stump, 41–42 respectively, which is supported on a fixed part of the installation in order to let said drum rotate about its axis 29.

The guides 22–23–24–25 and 21 can be for instance L-shaped in order to obtain on the one hand that, during rotation of the drums, the trolleys remain connected with the latter while on the other hand, said trolleys can move along the guides 21 from one drum to the other drum.

Said drums are driven separately but by preference simultaneously via a nonrepresented driving mechanism, while obviously means are provided which temporarily clamp the drums in the appropriate positions.

FIG. 11 illustrates four trolleys in full lines, while two trolleys are drawn in broken lines. This means that the device can be fitted at will with four, five or six trolleys according to what type of brushes are being manufactured.

Under the guides 21 there is a frame 43 which can be moved to-and-fro via four wheels 44 respectively 45–46 over rails. Onto such trolley it is possible to fasten either a cleaning device or a cutting device, or even a cleaning device together with a cutting device.

The operation of the machinery according to FIG. 11 is identical to that which has previously been described in connection with FIGS. 5 to 10.

The trolleys are made in such way that they are all contiguous, so that the displacements of the various trolleys are always equal to the length of this trolley. Obviously, the necessary means shall be provided for locking the trolleys in due time on the guides 20 and 21 in the correct position.

These horizontal displacements over the guides 20 and 21 can be obtained in any convenient way by exerting a pressure P on the first upper trolley, by means of a hydraulic, pneumatic or mechanical jack for instance, and by exerting onto the lowermost trolleys a force P1 which can be obtained in the same way.

It will be preferable to provide frame 43 onto which is mounted the cutting and/or combing device, with a to-and-fro motion according to arrow F, whereby this motion can be obtained in any appropriate way.

Figure 12:
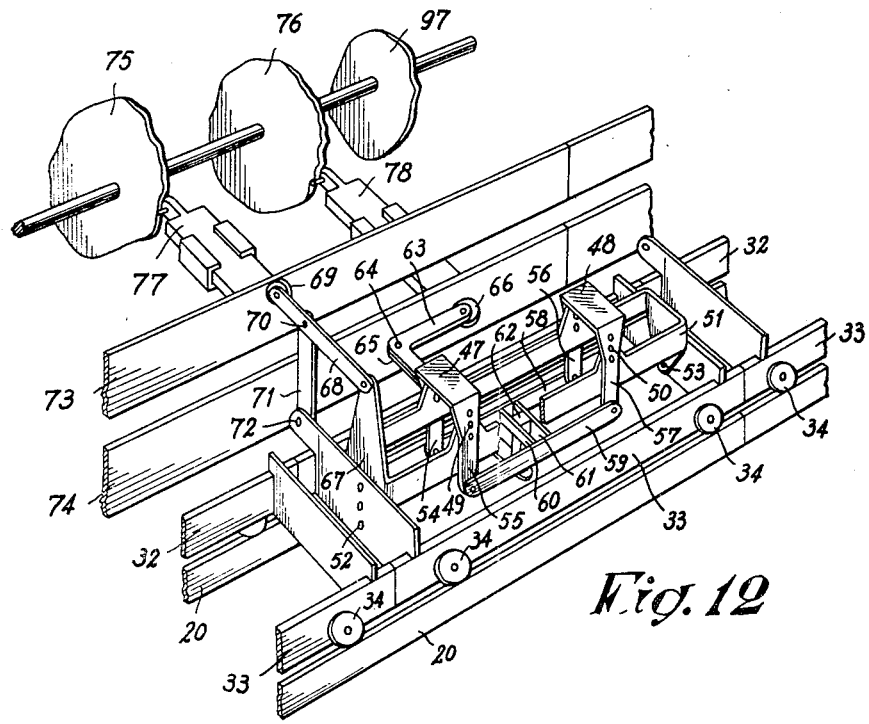
FIG. 12 illustrates in perspective and in a very diagrammatic manner the elements which control the workpiece-holders.

FIG. 12 illustrates in a diagrammatic way how, with such an installation, the various motions can be obtained from the brush bodies during the drilling and filling thereof, respectively, when the trolleys in question are situated under the tools 3–4 and/or 5–6.

With this purpose in view, each trolley is provided with two actual fastening flats for the brush bodies, 47–48 respectively, suspended by means of adjustable spindles 49–50 respectively, in a frame 51 which is itself fastened adjustably via spindles 52–53 respectively with the sides 31 and 30 of the corresponding trolley.

Said flats 47–48 are provided at each end with downwardly directed parts, 54–55–56–57 respectively, which are connected two by two by rods 58–59. The latter are again connected with each other by cross-parts, 60–61 respectively, whereby a vertical finger 62 is mounted between the latter, which finger is connected with a curved lever 63 connected by means of a hinge point 64 with a fixed part 65 of the trolley.

Toward the free end, aforesaid lever 63 is provided with a freely rotating roller 66.

In this case, aforesaid frame 51 is provided with a vertical eyelet 67 of which the end is hinged to a rod 68 whose second free end is provided with a freely rotating roller 69. Between the ends of said rod 68, the latter is, via a spindle 70, hinged to a turning bar 71 of which the other end is hinged around a spindle 72 with the side wall 31 of the corresponding trolley.

A similar mechanism 47 to 72 is provided on each separate trolley.

Behind the tools 3–4–5 and 6 longitudinal plates, 73–74 respectively are mounted, each of which is being displaced appropriately forward and rearward in order to tilt appropriately the flats 47 and 48 in all directions in a predetermined manner.

The motions of aforesaid plates 73 and 74 are obtained in some known way, such as by means of cams 75 and 76 respectively, acting onto a slide 77–78 respectively which is represented diagrammatically in FIG. 12 and onto which the longitudinal plates 73–74 are fastened.

It is clear that the motions of the bodies situated under the drilling tools and under the filling tools are controlled by aforesaid plates 73–74, whereas when the trolley has travelled past these devices, the workpiece-holders are held with the flats 47–48 in the horizontal position by the presence of the flats 79 and 80 which are preferably provided at all places where the brush bodies, respectively brushes, must be set in their horizontal position.

Figure 13:
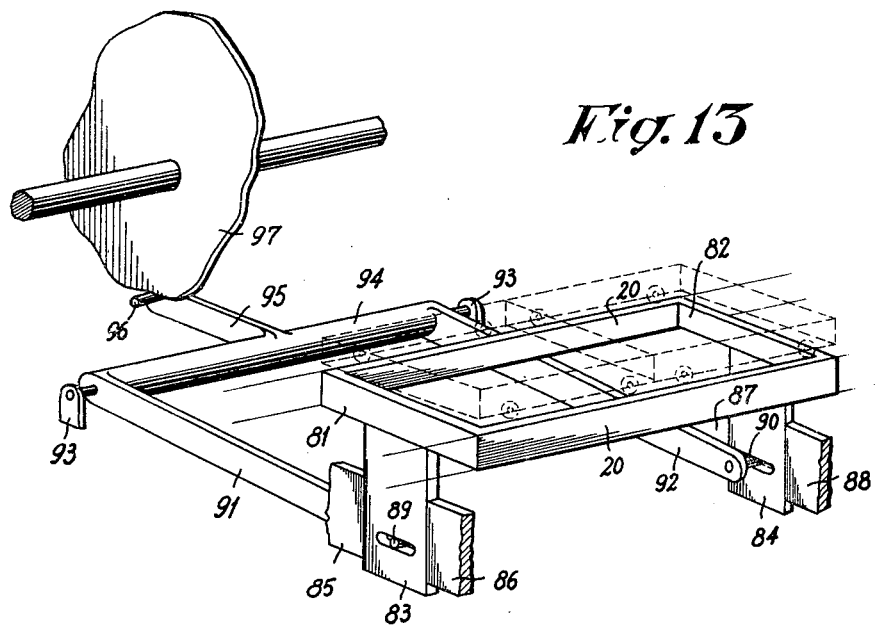
FIG. 13 illustrates diagrammatically a perspective view of the compensation adjustment of the machine according to the present invention.

FIG. 13 illustrates in a diagrammatic way the compensation motion of the workpiece-holders.

This compensation need only be carried out at the location of the tools 3–4–5 and 6, so that one single compensation device will do.

Such compensation device can for instance very efficiently be formed by connecting together aforesaid guides 20 by means of cross-slats 81–82 and then providing the resulting frame with downwardly directed vertically moving slides, 83–84 respectively, which can move between fixed guides 85–86–87 and 88, while each one of the slides 83–84 is connected by a rotating spindle 89 and 90 to arms 91–92 respectively which, near their other free end, are in turn hinged to and mounted on the fixed parts 93 of the device.

Said arms 91–92 shall preferably also be connected together by an insert 94 which acts through an extension 95 and a pin 96 onto the compensation control which may for instance be a cam 97.

FIG. 14 is a diagrammatic side view of the assembly according to FIG. 11, whereby it is shown that the reversing drum must undergo a rotation of 180°, and that the machine has a maximum height.

In order to diminish this height of the machine, it would be possible for instance, as illustrated in FIG. 15, to move the upper trolleys sideways with respect to those which are situated below.

FIG. 16 illustrates a variant of embodiment in which on the one hand the trolleys are displaced over guides 20 whereas the reversing drums are replaced by levers 98 which revolve about a spindle 99 and whereby the guides 21 are set at an angle of 90° to the guides 20 in order to cause the return motion of the trolleys to occur at an angle of 90° with respect to the forward motion.

It is quite obvious that in this case the cutting device and the cleaning device must be mounted at a spot under the guides 20, which is indicated diagrammatically by 100 in FIG. 16.

In a still different design, the reversing drum could be replaced by lifting devices which move the trolleys vertically upward, respectively downward.

In this way a brush manufacturing machine is obtained which is comparatively quite cheap and quite reliable in operation, whereby all operations are obtained with one single setting and whereby it is quite easy to switch over from one kind of make to another, while the number of workpiece-holders is limited to a minimum and the compensation adjustment needs only be carried out under the drilling and filling tools.

With such an installation it becomes possible to remove a trolley from the machine in order to install it on another machine for instance, which operation can be carried out in a very efficient way while, depending on the intended make, full freedom remains for working with four, five, six or another amount of trolleys.

The present invention is in no way limited to the kinds of embodiment which have been described above and illustrated in the appended drawings, but can be worked out in all kinds of shapes and dimensions without exceeding the scope of the invention.

What I claim is:

1. A brush manufacturing machine, comprising a plurality of workpiece holders, a plurality of trolleys, each of said trolleys being adapted to carry at least one of said workpiece holders, a trolley guide, another trolley guide located below the first-mentioned guide, a transfer mechanism located close to adjacent ends of said guides and comprising at least one third trolley guide and means moving said third guide in alignment with any one of the first-mentioned and second-mentioned guides; another transfer mechanism located close to opposite ends of the first-mentioned and second-mentioned guides and comprising at least one fourth trolley guide and means moving said fourth guide in alignment with any one of the first-mentioned and second-mentioned guides, means moving said trolleys along said guides, means holding trolleys located upon the third-mentioned and fourth-mentioned guides during their movements, and a plurality of brush processing stations located along the first-mentioned and second-mentioned guides.

2. A brush manufacturing machine in accordance with claim 1, wherein the first-mentioned and second-mentioned guides extend parallel to each other and wherein the moving means of each of the two transfer mechanisms comprise a drum, each of said drums having upper and lower portions and carrying a separate guide upon each of said portions.

3. A brush manufacturing machine in accordance with claim 1, wherein the first-mentioned and second-mentioned guides extend parallel to each other and wherein the moving means of each of the two transfer mechanisms comprise a lift carrying a single guide.

4. A brush manufacturing machine in accordance with claim 1, wherein the first-mentioned and second-mentioned guides extend at an angle to each other and wherein the moving means of each of the two transfer mechanisms comprise a rocking lever carrying two guides.

5. A brush manufacturing machine in accordance with claim 1, wherein said trolley holding means comprise L-shaped brackets having portions extending parallel to the third-mentioned and fourth-mentioned guides and other inwardly located portions facing these guides.

6. A brush manufacturing machine in accordance with claim 1, wherein said trolley holding means comprise U-shaped brackets having portions extending parallel to the third-mentioned and fourth-mentioned guides and other inwardly located portions facing these guides.

7. A brush manufacturing machine in accordance with claim 1, wherein each trolley comprises a frame member for a workpiece holder, a second frame member, the first-mentioned frame member being swingably connected with the second-mentioned frame member for pivoting about a horizontal axis perpendicular to the first-mentioned and second-mentioned guides, and means supporting the second-mentioned frame member for pivotal movement about a horizontal axis parallel to the first-mentioned and second-mentioned guides, and adjustable means controlling the movements of the two frame members.

8. A brush manufacturing machine in accordance with claim 1, wherein at least one of the two first-mentioned guides consists of a rigid frame, said machine further comprising a compensating cam and a leverage connecting said frame with said cam.

References Cited
UNITED STATES PATENTS

| | | | |
|---|---|---|---|
| 1,676,640 | 7/1928 | Elliot | 300—11 |
| 1,690,420 | 11/1928 | Michaelis | 300—11 |
| 2,487,019 | 11/1949 | Eichelberger | 269—56 XR |

GRANVILLE Y. CUSTER, JR., Primary Examiner